United States Patent
Sodeno

(10) Patent No.: US 10,245,989 B2
(45) Date of Patent: Apr. 2, 2019

(54) HEADREST

(71) Applicant: TACHI-S CO., LTD., Tokyo (JP)

(72) Inventor: Yutaka Sodeno, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/555,918

(22) PCT Filed: Mar. 2, 2016

(86) PCT No.: PCT/JP2016/056502
§ 371 (c)(1),
(2) Date: Sep. 5, 2017

(87) PCT Pub. No.: WO2016/143643
PCT Pub. Date: Sep. 15, 2016

(65) Prior Publication Data
US 2018/0043803 A1  Feb. 15, 2018

(30) Foreign Application Priority Data

Mar. 6, 2015 (JP) ................................. 2015-044566

(51) Int. Cl.
*B60N 2/844* (2018.01)
*B60N 2/815* (2018.01)
(Continued)

(52) U.S. Cl.
CPC ................ *B60N 2/844* (2018.02); *A47C 7/38* (2013.01); *B60N 2/80* (2018.02); *B60N 2/815* (2018.02)

(58) Field of Classification Search
CPC ......... B60N 2/844; B60N 2/815; B60N 2/897
See application file for complete search history.

(56) References Cited

U.S. PATENT DOCUMENTS

| 4,750,878 A | * | 6/1988 | Nix | ........................ B25B 27/28 |
| | | | | 384/295 |
| RE36,009 E | * | 12/1998 | Shultz | ................... B25B 27/023 |
| | | | | 29/898.08 |

(Continued)

FOREIGN PATENT DOCUMENTS

| JP | 2012-201152 A | 10/2012 |
| JP | 2012-250647 A | 12/2012 |

(Continued)

OTHER PUBLICATIONS

International Search Report and Written Opinion of the International Searching Authority, dated May 24, 2016, for International Application No. PCT/JP2016/056502, 7 pages (with partial English translation).

(Continued)

*Primary Examiner* — Timothy J Brindley
(74) *Attorney, Agent, or Firm* — Seed IP Law Group LLP

(57) ABSTRACT

A headrest includes a headrest body which is tiltably supported by a stay held on a seat back, a lock part which locks the headrest body in a non-tiltable manner, and a lock release part which releases lock of the lock part. The lock release part includes an operation button to be pressed, a biasing member which biases the operation button in an opposite direction to a pressing direction of the operation button, and a bezel which has a cylinder wall and a bottom wall for containing the operation button to be movable back and forth in the pressing direction, and is provided with a locking part which locks the operation button biased by the biasing member to hold the operation button in the cylinder wall. The locking part is provided in the bottom wall.

2 Claims, 8 Drawing Sheets

(51) Int. Cl.
*A47C 7/38* (2006.01)
*B60N 2/80* (2018.01)

(56) References Cited

U.S. PATENT DOCUMENTS

| | | | | |
|---|---|---|---|---|
| 6,158,099 | A * | 12/2000 | Skrzypek | B25B 31/00 29/255 |
| 6,845,973 | B2 * | 1/2005 | Ferrer | F16F 9/0454 267/64.21 |
| 6,910,740 | B2 * | 6/2005 | Baker | B60N 2/844 297/408 |
| 8,025,338 | B2 * | 9/2011 | Brunner | B60N 2/815 297/410 |
| 9,403,457 | B2 * | 8/2016 | Nakata | B60N 2/809 |
| 2003/0173811 | A1 * | 9/2003 | Pausch | B60N 2/838 297/391 |
| 2010/0236911 | A1 * | 9/2010 | Wild | H01H 3/022 200/345 |
| 2012/0007404 | A1 | 1/2012 | Tscherbner et al. | |
| 2013/0134761 | A1 | 5/2013 | Willard et al. | |
| 2014/0167476 | A1 * | 6/2014 | Wang | B60N 2/4844 297/391 |
| 2014/0183925 | A1 * | 7/2014 | Clauser | B60N 2/5825 297/452.38 |
| 2015/0145310 | A1 * | 5/2015 | Jeong | B60N 2/4814 297/408 |
| 2015/0232002 | A1 * | 8/2015 | Little | B60N 2/844 297/408 |
| 2015/0266401 | A1 * | 9/2015 | Grable | B60N 2/4844 297/408 |
| 2015/0306995 | A1 * | 10/2015 | Tachikawa | B60N 2/5825 297/408 |
| 2016/0243965 | A1 * | 8/2016 | Hoffmann | B60N 2/815 |
| 2017/0120786 | A1 * | 5/2017 | Cao | B60N 2/4814 |

FOREIGN PATENT DOCUMENTS

| | | |
|---|---|---|
| JP | 2013-154799 A | 8/2013 |
| JP | 2016-164029 A | 8/2016 |

OTHER PUBLICATIONS

Notification of Reasons for Refusal, dated Oct. 30, 2018, for Japanese Application No. 2015-044566, 5 pages (with English Translation).

* cited by examiner

HEADREST

TECHNICAL FIELD

The present invention relates to a headrest.

BACKGROUND ART

In a vehicle seat and the like, a headrest is known which is configured to be tiltable in a front and rear direction of a seat. Typically, such a headrest includes a stay held on a seat back, a headrest body tiltably supported by the stay, and a lock mechanism which locks the headrest body at a desired tilting angle.

The lock mechanism is configured such that an operation button of the lock mechanism is provided in a side surface of the headrest and the like, and the lock of the headrest body by the lock mechanism is released by the pressing operation on the operation button (for example, see Patent Literature 1).

RELATED ART REFERENCE

Patent Document

Patent Literature 1: JP-A-2012-201152

SUMMARY OF THE INVENTION

Problems to be Solved by the Invention

An operation button of the lock mechanism is contained in a cylindrical bezel, and is supported by the bezel to be movable in an axial direction of the bezel and attached in the headrest body. The operation button is pressed toward the inside of the headrest, and is biased by a biasing member such as a coil spring in an opposite direction to a pressing direction.

A notch extending in the axial direction of the bezel is provided in a cylinder wall of the bezel, a locking pawl which is engaged in the notch is provided in the operation button, and when the locking pawl is engaged in the notch, the operation button is held against the biasing of the biasing member in the bezel.

In above-described configuration, when the operation button is assembled with the bezel, an opening of the bezel and an inner peripheral surface of the cylinder wall connected with the opening may be rubbed against the locking pawl of the operation button, so that a scratch may remain on the opening of the bezel and the inner peripheral surface of the cylinder wall. The bezel not only holds the operation button but also serves as a decoration, and thus there is a concern that the scratch of the opening of the bezel and the inner peripheral surface of the cylinder wall deteriorates the appearance quality of the headrest.

When the operation button is pressed in by the pressing operation, the notch provided in the cylinder wall of the bezel may be exposed so that the inside of the headrest is seen through the notch, and also there is a concern that the appearance quality of the headrest is deteriorated.

The present invention has been made in consideration of the above situation, and an object thereof is to improve an appearance quality of a headrest.

Means for Solving the Problems

A headrest of one aspect of the present invention includes: a stay held on a seat back; a headrest body which is supported tiltably about a tilting shaft provided in the stay; a lock part which locks the headrest body in a non-tiltable manner; and a lock release part which releases lock of the lock part. The lock release part includes an operation button to be pressed, a biasing member which biases the operation button in an opposite direction to a pressing direction of the operation button, and a bezel which has a cylinder wall and a bottom wall for containing the operation button to be movable back and forth in the pressing direction, and is provided with a locking part which locks the operation button biased by the biasing member to hold the operation button in the cylinder wall. The locking part is provided in the bottom wall.

Advantages of the Invention

According to the present invention, it is possible to improve the appearance quality of the headrest.

MODES FOR CARRYING OUT THE INVENTION

Figure 1:
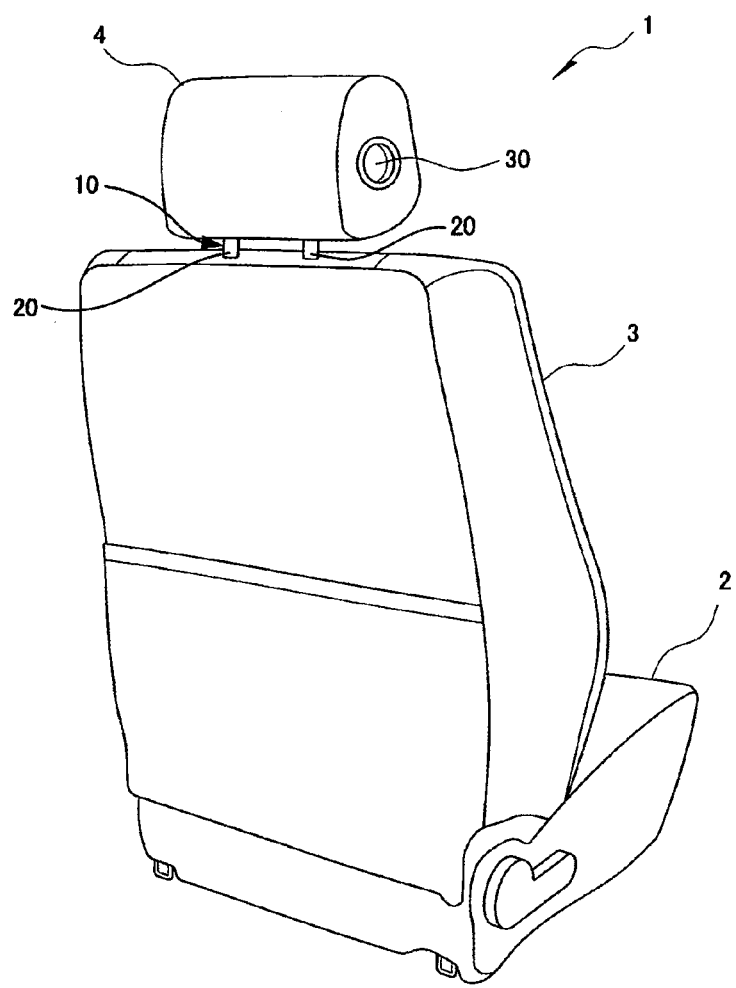
FIG. 1 is a perspective view illustrating a configuration of one example of a vehicle seat including a headrest for explaining an embodiment of the present invention.

FIG. 1 is a perspective view illustrating a configuration of one example of a vehicle seat including a headrest for explaining an embodiment of the present invention.

A vehicle seat 1 illustrated in FIG. 1 includes a seat cushion 2 configuring a seat surface portion, a seat back 3 configuring a back rest portion, and a headrest 4 supporting a head of an occupant sitting on the seat.

The headrest 4 includes a stay 10 configuring a frame of the headrest 4, and a pair of leg parts 20 protruding below the headrest 4 are provided with a gap interposed therebetween in a width direction of the vehicle seat 1 in the stay 10. The pair of leg parts 20 are inserted into the seat back 3 to be held in the seat back 3. Incidentally, an insertion amount of the leg part 20 into the seat back 3 is adjustable, and the height of the headrest 4 is adjustable such that the headrest 4 is aligned with the position of the head of the occupant.

The headrest 4 is configured such that the tilt of the vehicle seat 1 in the front and rear direction is adjustable, and an operation button 30 which is pressed when the tilt of the headrest 4 is adjusted is provided in one side surface of the headrest 4.

Figure 2:
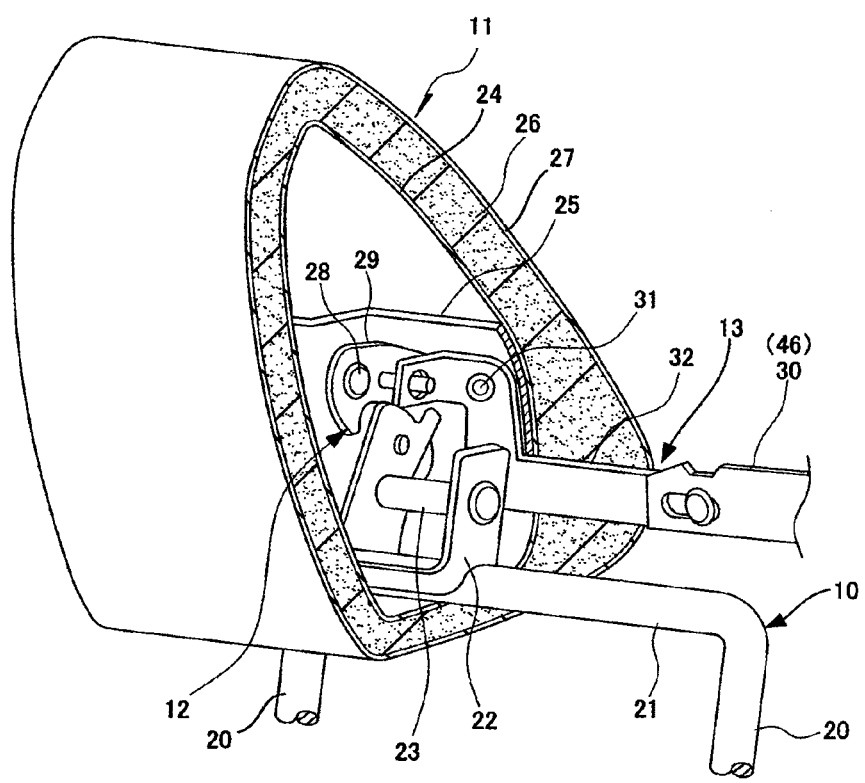
FIG. 2 is a partially cutaway perspective view illustrating the headrest of FIG. 1.
Figure 3:
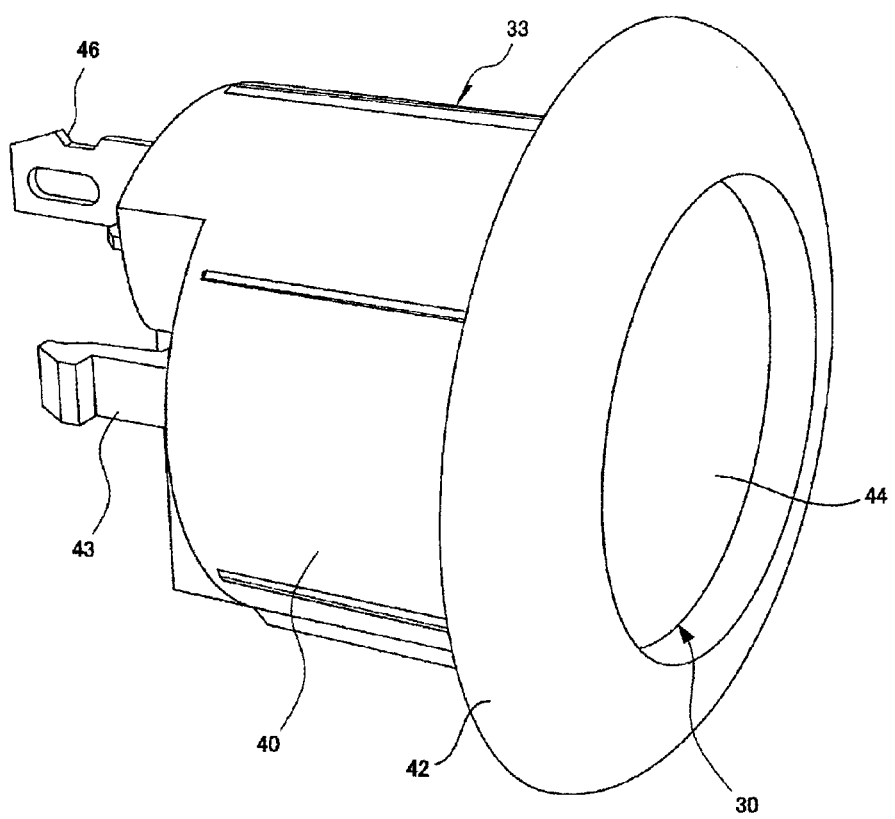
FIG. 3 is a perspective view illustrating a configuration of an operation portion of a lock release part of the headrest of FIG. 1.
Figure 4:
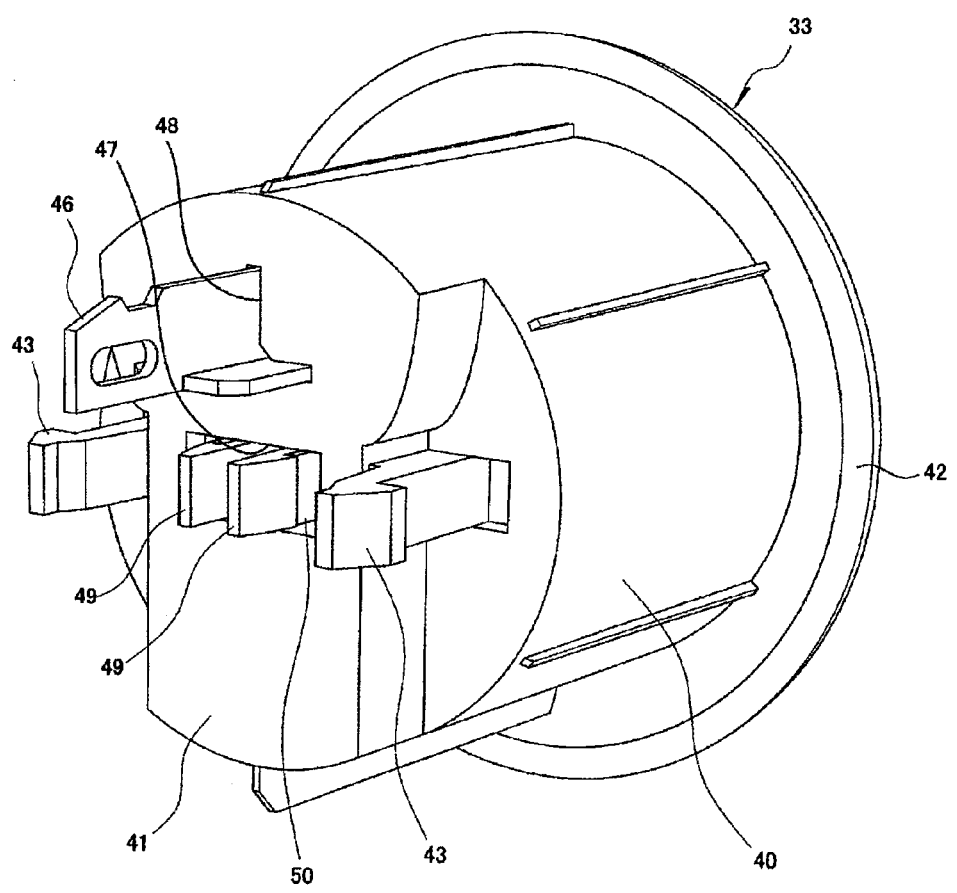
FIG. 4 is a perspective view illustrating the configuration of the operation portion of FIG. 3.
Figure 5:
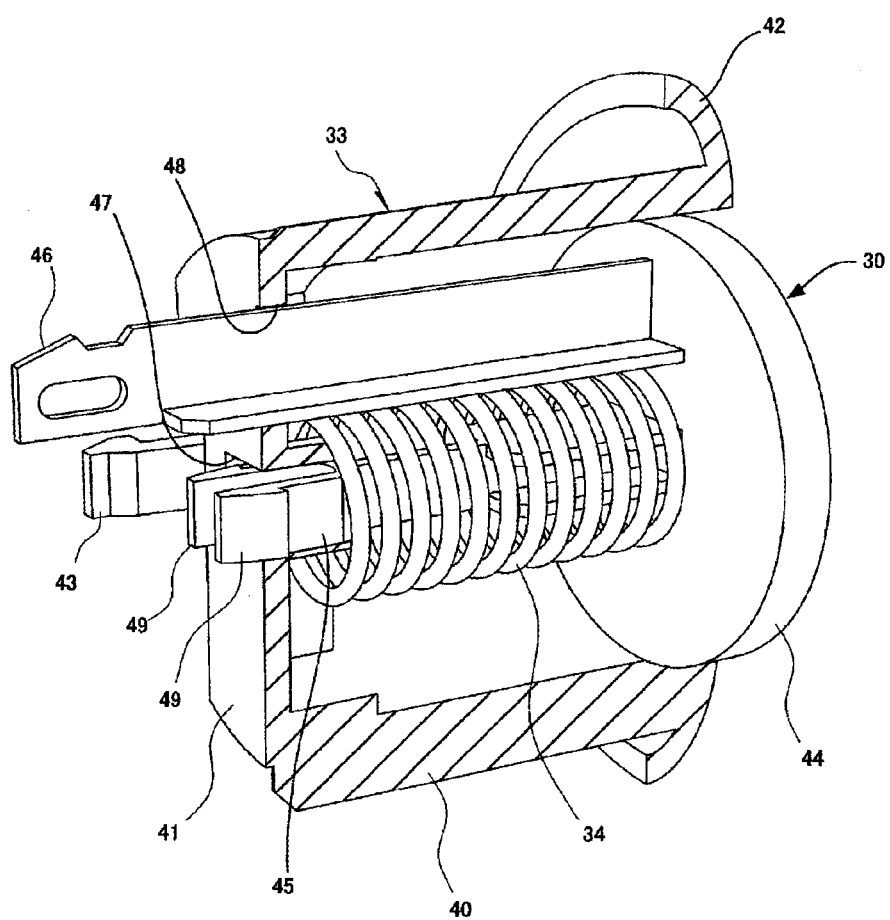
FIG. 5 is a perspective view illustrating the configuration of the operation portion of FIG. 3 in a state where a bezel is cut away.
Figure 6:
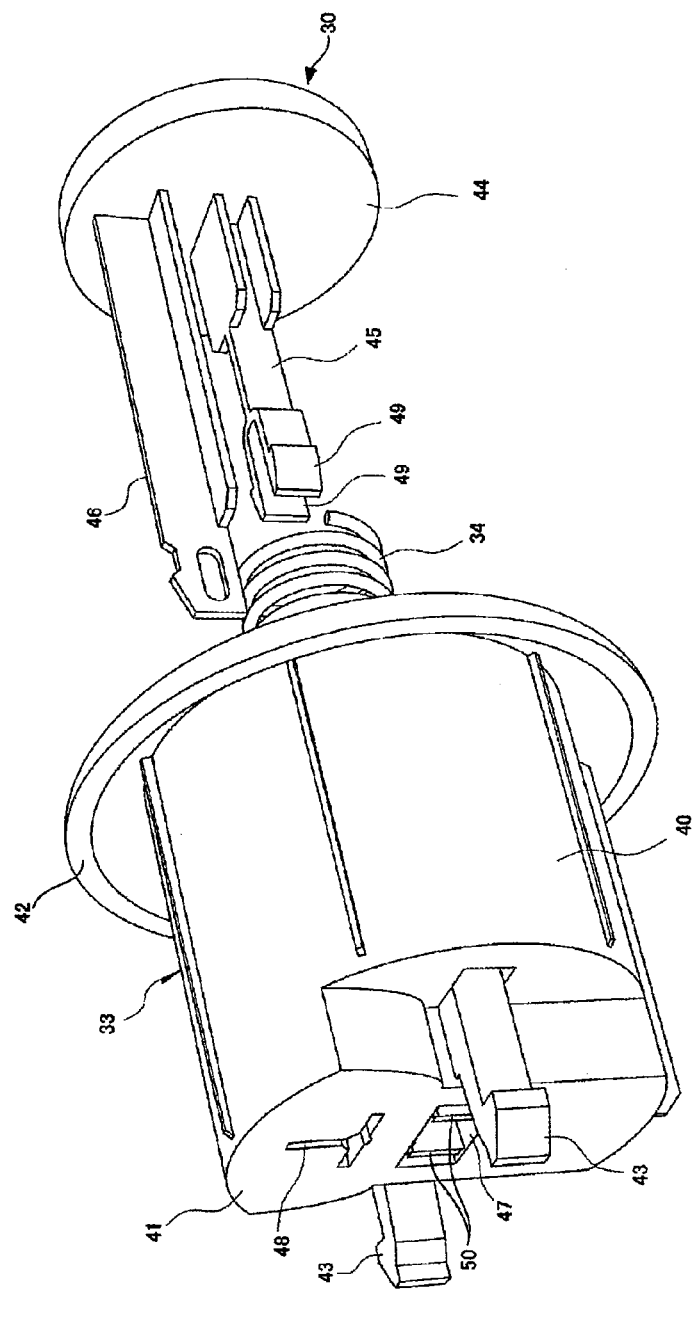
FIG. 6 is an exploded perspective view illustrating the configuration of the operation portion of FIG. 3.
Figure 7:
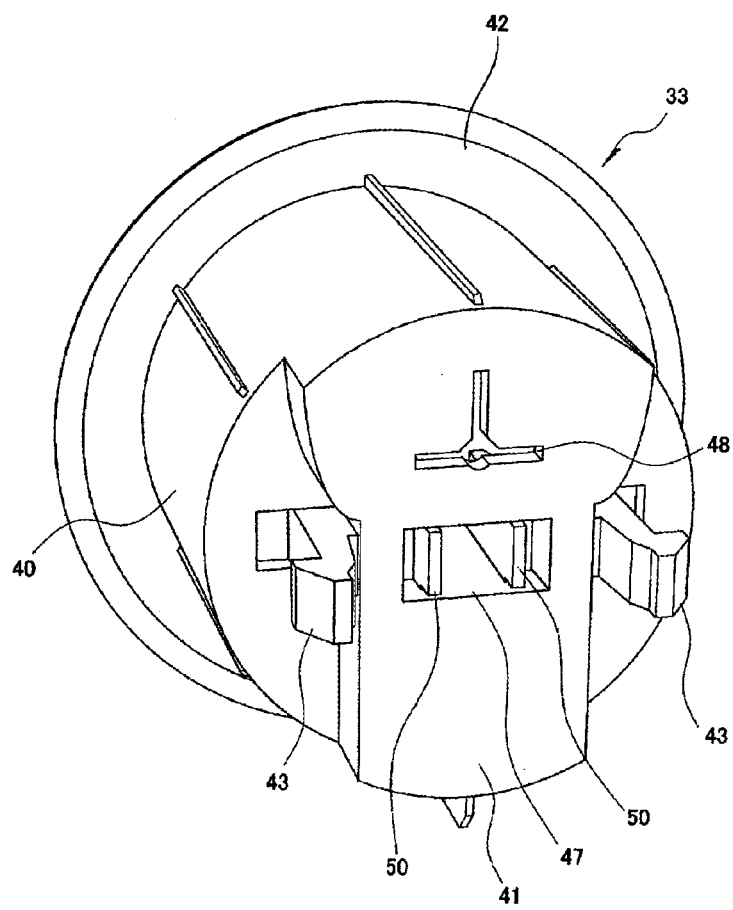
FIG. 7 is a perspective view of the bezel of the operation portion of FIG. 3.

FIG. 2 illustrates a configuration of the headrest 4.

The headrest 4 includes the stay 10, a headrest body 11 which is tiltably supported by the stay 10, a lock part 12 which locks the headrest body 11 in a non-tiltable manner, and a lock release part 13 which releases lock of the lock part 12.

The stay 10 includes the pair of leg parts 20, a connecting part 21 which connects the upper ends of the pair of leg parts 20 to each other, and a tilting shaft 23 which is fixed in the connecting part 21 through a bracket 22. The headrest body 11 is supported tiltably about the tilting shaft 23.

The headrest body 11 includes a core 24 and a base plate 25 fixed in the core 24. The core 24 is a molded body of synthetic resin, for example, and the inner portion of the core 24 is formed to be hollow. The tilting shaft 23 of the stay 10, the lock part 12, and the lock release part 13 are partially contained in the core 24. The outside of the core 24 is covered with a cushion pad 26 and a skin material 27. The base plate 25 is contained in the core 24 to be fixed in the core 24. Further, the base plate 25 is supported to be tiltable about the tilting shaft 23 of the stay 10 contained in the core 24.

The lock part 12 includes a ratchet 29. The ratchet 29 is supported to be rotatable about a rotating shaft 28 provided in the base plate 25 of the headrest body 11. A tooth meshed with the ratchet 29 is formed in the bracket 22 in which the tilting shaft 23 is fixed, and the base plate 25 is locked in a non-tiltable manner when the ratchet 29 is meshed with the tooth of the bracket 22. Further, the ratchet 29 is biased by a biasing member (not illustrated) in a direction to be meshed with the tooth of the bracket 22.

The lock release part 13 includes the operation button 30 and a lever 32. The lever 32 is supported to be rotatable about the rotating shaft 31 provided in the base plate 25 of the headrest body 11. One end of the lever 32 is engaged in the ratchet 29 of the lock part 12, and the other end of the lever 32 is connected with the operation button 30.

According to the pressing operation with respect to the operation button 30, the end of the lever 32 connected with the operation button 30 is pressed in, and the lever 32 is rotated. Further, according to the rotation of the lever 32, the ratchet 29 is rotated in a direction to release the engagement of the ratchet 29 and the tooth of the bracket 22. When the ratchet 29 is rotated by the lever 32 so as to release the engagement of the ratchet 29 and the tooth of the bracket 22, the lock of the headrest body 11 (base plate 25) by the lock part 12 is released. Accordingly, the headrest body 11 becomes tiltable, and the tilting angle of the headrest body 11 is adjusted.

When the pressing operation with respect to the operation button 30 is released, the biased ratchet 29 is meshed with the tooth of the bracket 22, and the headrest body 11 (base plate 25) is locked again by the lock part 12 in a non-tiltable manner.

Next, a configuration of an operation portion including the operation button 30 of the lock release part 13 will be described with reference to FIGS. 3 to 8.

The operation portion of the lock release part 13 includes the operation button 30, a bezel 33 which contains the operation button 30, and a biasing member 34 which biases the operation button 30.

The bezel 33 includes a cylinder wall 40 formed in a substantially cylindrical shape, and a bottom wall 41 which closes one end of the cylinder wall 40. The other end side of the cylinder wall 40 is open. A flange 42 which spreads to the outer diameter side is provided in the open end of the cylinder wall 40, and a pair of fixing pawls 43 which extend in the axial direction of the cylinder wall 40 are provided in the bottom wall 41.

The bezel 33 penetrates the skin material 27, the cushion pad 26, and the core 24 to be inserted into an attachment hole provided in the headrest body 11, and the pair of fixing pawls 43 are engaged with the inner surface of the core 24. Further, the skin material 27, the cushion pad 26, and the core 24 are held between the pair of fixing pawls 43 and the flange 42, and the bezel 33 is fixed in the headrest body 11.

The operation button 30 includes a pressure receiving part 44 which receives the pressing operation, a guide part 45 which guides the movement of the operation button 30 in association with the pressing operation, and a connecting part 46 which is connected with the lever 32 of the lock release part 13. The pressure receiving part 44 is formed to have a substantially disc shape which has a slightly smaller diameter than the cylinder wall 40 of the bezel 33. The guide part 45 and the connecting part 46 are provided to extend from the back surface of the pressure receiving part 44 facing the bottom wall 41 of the bezel 33 along a central axis of the pressure receiving part 44. In the illustrated example, the guide part 45 is arranged on the central axis of the pressure receiving part 44, and the connecting part 46 is arranged to be deviated from the central axis of the pressure receiving part 44 to the outer diameter side.

A guide hole 47 into which the guide part 45 is inserted and an insertion hole 48 into which the connecting part 46 is inserted are formed in the bottom wall 41 of the bezel 33. In the illustrated example, the guide hole 47 is arranged on the central axis of the cylinder wall 40, and the insertion hole 48 is arranged to be deviated from the central axis of the cylinder wall 40 to the outer diameter side.

The guide hole 47 is formed in a cylindrical shape, and is provided to extend along the central axis of the cylinder wall 40. The operation button 30 in which the guide part 45 is inserted into the guide hole 47 is guided in the axial direction of the cylinder wall 40. In addition, the tip of the connecting part 46 which is inserted into the insertion hole 48 protrudes into the core 24 of the headrest body 11, and is connected with the lever 32 of the lock release part 13 (see FIG. 2).

The operation button 30 is pressed in toward the bottom wall 41 by the pressing operation. The biasing member 34 biases the operation button 30 in an opposite direction to the pressing direction of the operation button 30, that is, in a direction in which the operation button 30 is separated from the bottom wall 41. In the illustrated example, a coil spring is used as the biasing member 34. The biasing member 34 is provided between the pressure receiving part 44 and the bottom wall 41 to surround the guide part 45.

The tip of the guide part 45 which protrudes from the guide hole 47 are provided with a pair of locking pawls 49 which are formed almost symmetrically with the central axis of the pressure receiving part 44 in which the guide part 45 is arranged interposed therebetween. An edge (locking part) of an outlet-side opening of the guide hole 47 is provided with a pair of locking pieces 50 which are elastically deformable and are formed almost symmetrically with the central axis of the guide hole 47 interposed therebetween. The pair of locking pawls 49 are pinched between the pair of locking pieces 50 to be engaged with the pair of locking pieces 50, respectively. Accordingly, the operation button 30 is retained in the bezel 33 against the biasing of the biasing member 34.

Figure 8:
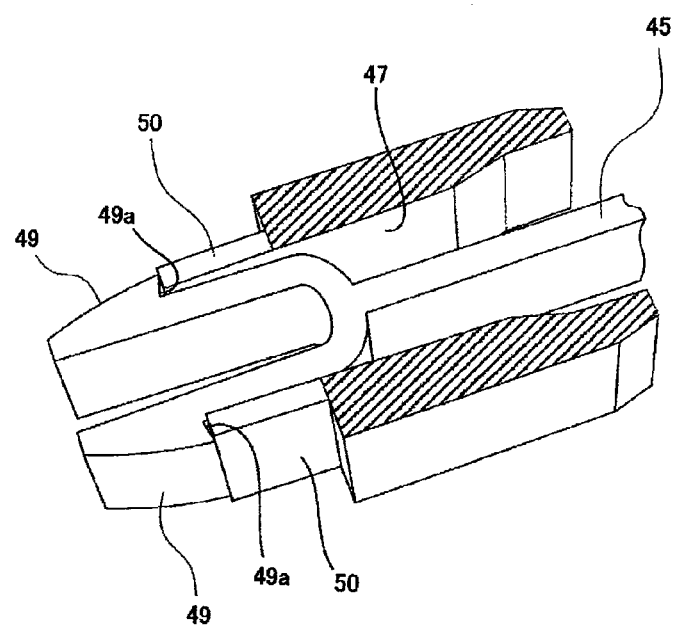
FIG. 8 is a perspective view illustrating a configuration of an engaging place between the bezel of the operation portion of FIG. 3 and an operation button.

As illustrated in FIG. 8, engaging surfaces 49a of the locking pawls 49 which are engaged with the locking pieces 50 are formed as tilted surfaces which are brought close to each other toward the pressing direction of the operation button 30. By being engaged with the tilted engaging surfaces 49a, the pair of locking pieces 50 which pinch the pair of locking pawls 49 therebetween are bent elastically in a direction in which the tips are brought close to the central axis side of the guide hole 47. Accordingly, the pair of locking pawls 49 and the guide part 45 in which the locking pawls 49 are provided are held by the pair of locking pieces 50.

In the operation portion of the lock release part 13 configured as above, a locking part (the edge of the outlet-side opening of the guide hole 47) is provided not in the cylinder wall 40 of the bezel 33 which locks the operation button 30, but in the bottom wall 41. Therefore, it is prevented that the pair of locking pawls 49 of the operation button 30 and the inner peripheral surface of the cylinder wall 40 are rubbed when the operation button 30 is assembled with the bezel 33, and thus it can be prevented that the scratch remains in the opening of the bezel 33 and the inner peripheral surface of the cylinder wall 40 to deteriorate the appearance quality.

The locking part of the bezel 33 is provided in the bottom wall 41 normally covered with the operation button 30. Therefore, the inner portion of the headrest 4 is not seen even in a case where the operation button 30 is pressed in, and thus it is possible to prevent the deterioration of the appearance quality of the headrest 4.

As for the bias of the operation button 30 by the biasing member 34 or the coming-out of the operation button 30 from the bezel 33, the pair of locking pieces 50 provided in the locking part (the edge of the outlet-side opening of the guide hole 47) of the bezel 33 are bent by being engaged with the tilted engaging surfaces 49a of the locking pawls 49, respectively, and the pair of locking pawls 49 and the guide part 45 are held by the pair of locking pieces 50. Accordingly, it is possible to improve the holding force of the bezel 33 with respect to the operation button 30, and it is possible to obtain a sufficient holding force even in a case where the locking pawl 49 is miniaturized in view of a space efficiency of the bottom wall 41. In addition, it is possible to suppress a vibration of the operation button 30 or the occurrence of rattling sound due to the vibration.

The guide part 45 of the operation button 30 which is inserted into the guide hole 47 of the bezel 33 to be arranged along the central axis of the cylinder wall 40 is held by the pair of locking pieces 50 provided in the edge of the outlet-side opening of the guide hole 47. Thus, it is suppressed that the guide part 45 is tilted with respect to the central axis of the cylinder wall 40, and it is suppressed that the operation button 30 becomes eccentric with respect to the cylinder wall 40 due to the tilt of the guide part 45. Accordingly, a deviation of a clearance between the operation button 30 and the cylinder wall 40 is suppressed, so that it can be suppressed that the rattling sound occurs due to the vibration of the operation button 30.

The biasing member 34 is provided to surround the guide part 45, and the operation button 30 is biased about the guide part 45 with an excellent balance. Thus, it is possible to further suppress that the operation button 30 becomes eccentric with respect to the cylinder wall 40.

INDUSTRIAL APPLICABILITY

The headrest of one aspect of the present invention is not limited to the headrest of the vehicle seat mounted in a vehicle such as an automobile, but may be applied to a headrest of another seat such as an office chair.

The present application is based on Japanese Patent Application (No. 2015-044566) filed on Mar. 6, 2015, and the contents thereof are incorporated hereinto by reference.

DESCRIPTION OF REFERENCE NUMERALS AND SIGNS

1: vehicle seat
2: seat cushion
3: seat back
4: headrest
10: stay
11: headrest body
12: lock part
13: lock release part
30: operation button
33: bezel
34: biasing member
40: cylinder wall
41: bottom wall
45: guide part
47: guide hole
49: locking pawl
49a: engaging surface
50: locking piece

The invention claimed is:
1. A headrest comprising:
a stay held on a seat back;
a headrest body which is supported tiltably about a tilting shaft provided in the stay;
a lock part which locks the headrest body in a non-tiltable manner; and
a lock release part which releases lock of the lock part, the lock release part includes:
an operation button to be pressed, the operation button has a pair of locking pawls;
a biasing member which biases the operation button in an opposite direction to a pressing direction of the operation button; and
a bezel which has a cylinder wall and a bottom wall for containing the operation button to be movable back and forth in the pressing direction, and is provided with a locking part which locks the operation button biased by the biasing member to hold the operation button in the cylinder wall, wherein:
the locking part is provided in the bottom wall, the locking part including a pair of elastically deformable locking pieces which extend in the pressing direction and pinch the pair of locking pawls therebetween to be engages with the pair of locking pawls respectively,
respective engaging surfaces of the pair of locking pawls which are engaged with the locking pieces are formed as tilted surfaces which are brought close to each other toward the pressing direction,
the operation button including a guide part which extends along a central axis of the cylinder wall,
the pair of locking pawls are provided in a tip of the guide part,
the bottom wall includes a guide hole into which the guide part is inserted, and
the pair of locking pieces are in an edge of the guide hole.
2. The headrest according to claim 1, wherein
the biasing member is provided between the operation button and the bottom wall to surround the guide part.

* * * * *